United States Patent [19]

Abdallah et al.

[11] Patent Number: 5,273,243
[45] Date of Patent: Dec. 28, 1993

[54] RADIO SPEAKER MOUNTING APPARATUS AND METHOD

[75] Inventors: Ali M. Abdallah, Dearborn; Kenneth W. Hensley, Madison Heights, both of Mich.

[73] Assignee: General Motors Corporation, Detroit, Mich.

[21] Appl. No.: 179,459

[22] Filed: Apr. 8, 1988

[51] Int. Cl.$^5$ .................................................. G12B 9/00
[52] U.S. Cl. ................................. 248/27.1; 181/141; 181/150; 181/171; 181/172
[58] Field of Search ............... 248/27.1, 27.3, 310, 248/312.1, 231.9, 225.1; 181/141, 150, 171, 172; 381/205, 88, 90, 188

[56] References Cited

U.S. PATENT DOCUMENTS

| | | | |
|---|---|---|---|
| 736,404 | 8/1903 | Kibling | 248/310 |
| 3,575,370 | 4/1971 | Morris | 248/27.3 X |
| 3,868,077 | 2/1975 | Van Tiel et al. | 248/27.1 |
| 4,072,829 | 2/1978 | Ogihara | 381/205 |
| 4,267,993 | 5/1981 | Shimizu et al. | 248/27.1 |
| 4,289,929 | 9/1981 | Hathaway | 381/188 X |
| 4,484,658 | 11/1984 | Grote | 381/188 X |

FOREIGN PATENT DOCUMENTS 0084598  5/1983  Japan .................................. 381/188

OTHER PUBLICATIONS

Pp. 9-26 and 9-27 of Cadillac Front Wheel Drive DeVille and Fleetwood Service Information.
Pp. 5-40 and 5-41 and pp. 9-65 through 9-69 of the 1985 Fisher Body Service Manual.

Primary Examiner—Karen J. Chotkowski
Attorney, Agent, or Firm—Charles E. Leahy

[57] ABSTRACT

A radio speaker is mounted in an aperture of a vehicle panel having an outerside and underside. A flange is provided the panel underside underlying the aperture. The aperture is larger than the speaker and the speaker is installed from the panel outerside through the aperture to rest on the flange. The flange surrounds only a portion of the aperture to define an opening laterally of the speaker through which the speaker may be removed from the panel underside by movement laterally of the aperture. A fastener is installed from the panel outerside to retain the speaker on the flange and is removable from the panel underside to dismount the speaker from the panel. Alternatively, the aperture may be smaller than the speaker and a series of flanged tabs struck from the panel surrounding only a portion of the aperture so that the speaker may be installed from the underside of the panel by sliding the speaker laterally of the panel to engage the speaker with the flanged tabs. Alternatively, the flange is provided by flanged tabs struck from the panel on the underside at diametrically opposed sides of the aperture so that the speaker may be installed by orienting the speaker axially with the aperture but in rotary disalignment with respect to the flanged tabs. The speaker is then lifted against the panel underside and rotated into engagement with the diametrically opposed flanged tabs.

2 Claims, 3 Drawing Sheets

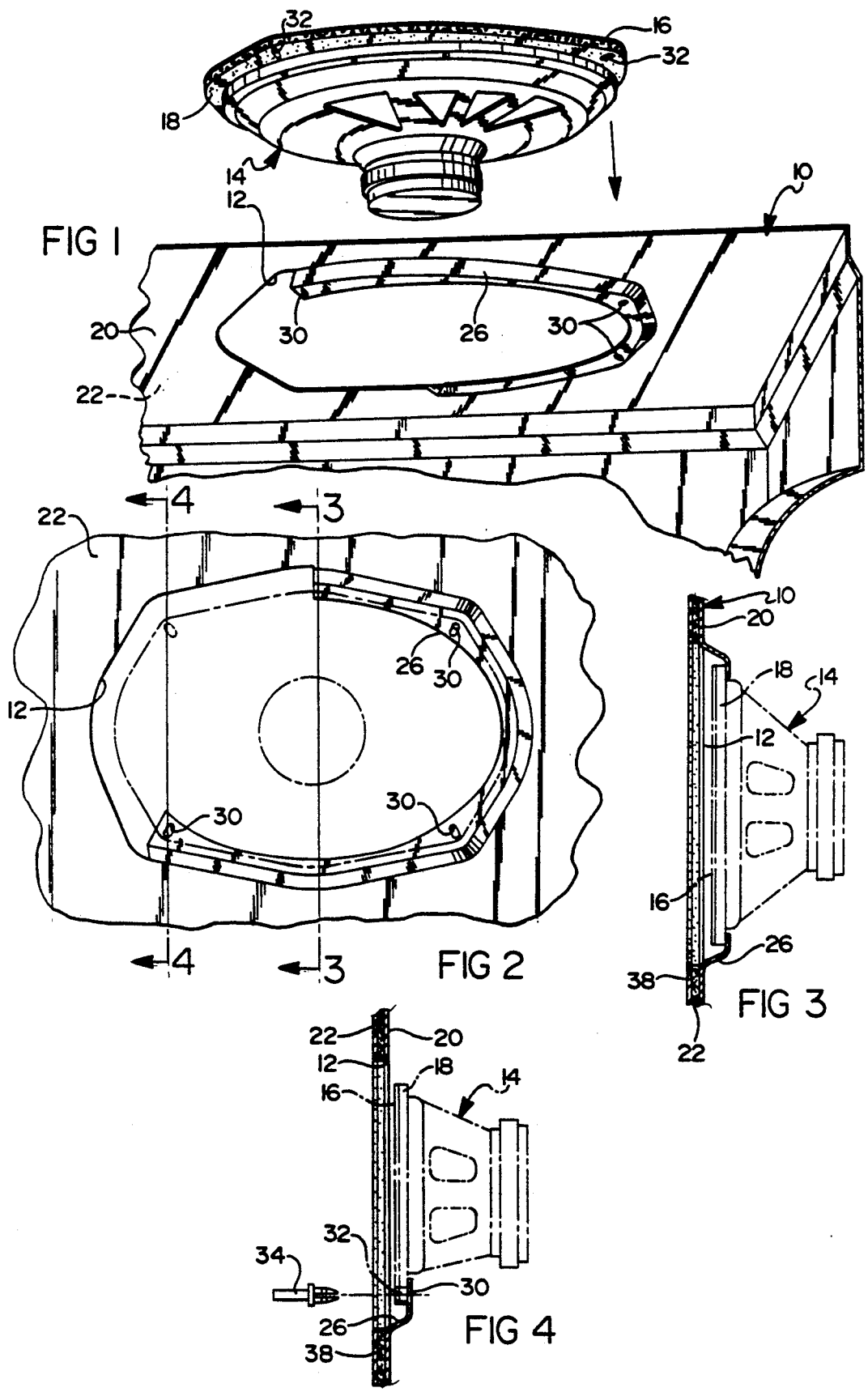

RADIO SPEAKER MOUNTING APPARATUS AND METHOD

The invention relates to a radio speaker mounting apparatus and method for mounting a speaker on a vehicle body.

BACKGROUND OF THE INVENTION

It is well known in motor vehicles to mount a radio speaker on the package shelf behind the rear seat. The package shelf is traditionally a sheet metal vehicle panel which extends horizontally between the top of the rear seat and the rear window. An aperture is provided in the vehicle panel and the speaker is mounted against the underside of the panel. The speaker has a flange which contacts the panel and a gasket is interposed between the flange and the panel to prevent rattles. A suitable fastener is provided to retain the speaker flange against the underside of the panel. The panel is traditionally covered by a decorative trim material, such as a vinyl covered cardboard, to conceal the speaker from view. A speaker opening in the form of slots or holes is provided in the decorative trim panel to permit free passage of the sound emanating from a speaker.

In order to install the speaker in the vehicle body in the assembly plant, the assembler must reach or crawl into the trunk to lift the speaker against the underside of the panel and install the fastener.

In the service garage, the mechanic reaches or crawls into the trunk and removes the fasteners to permit the speaker to drop away from the panel for service or replacement.

It would be desirable to provide a new and improved speaker installation apparatus and method which would permit the vehicle assembler to install the speaker from the outerside of the package shelf panel to thereby prevent the necessity for crawling or reaching into the luggage compartment.

Furthermore it would be desirable to provide such a speaker installation apparatus and method by which the speaker could be removed from the underside of the compartment by the garage mechanic so that the decorative trim panel concealing the speaker would not be affected.

SUMMARY OF THE INVENTION

According to the invention a radio speaker is mounted in an aperture of a vehicle panel having an outerside and underside. A flange is provided on the panel on the underside thereof and underlying the aperture. The aperture is larger than the speaker to permit the speaker to be installed from the outerside of the panel through the aperture to rest on the flange so that the flange supports the speaker in the aperture. The flange surrounds only a portion of the aperture to define an opening laterally of the speaker through which the speaker may be removed from the underside of the panel by movement laterally of the aperture. A fastener is installable from the outerside of the panel to retain the speaker on the flange and is removable from the underside of the panel to permit dismounting of the speaker from the panel.

In a second embodiment of the invention the aperture is smaller than the speaker and flange is provided by a series of flanged tabs struck from panel to define a flange underlying the panel and surrounding only a portion of the aperture so that the speaker may be installed from the underside of the panel in underlying alignment with the aperture by sliding the speaker laterally of the panel along the underside thereof to engage the speaker with the flanged tabs so that the speaker is supported between the flanged tabs and the underside of the panel. Accordingly the speaker may be removed by sliding the speaker laterally of the panel to disengage the speaker from the flanged tabs.

In a third embodiment of the invention the aperture is smaller than the speaker and the flange is provided by flanged tabs struck from the panel on the underside thereof and surrounding only a portion of the aperture at generally diametrically opposed sides of the aperture so that the speaker may be installed in underlying alignment with the aperture by orienting the speaker axially with the aperture but in rotary disalignment with respect to the flanged tabs. The speaker may be engaged against the underside of the panel and then rotated into engagement with the diametrically opposed flanges so that the speaker is supported between the flanged tabs and the underside of the panel. The speaker is disengaged by rotary movement of the speaker to disalign with respect to the flanged tabs and permit the speaker to drop away from the underside of the panel.

Accordingly one object of the invention is the provision of a speaker mounting apparatus and method in which the speaker may be installed from the outerside of the aperture vehicle panel in the assembly plant and then removed from the underside of the panel for aftermarket service.

Another feature, object, and advantage of the invention resides in the provision of an aperture in the vehicle body panel larger than the speaker to permit the speaker to pass through the panel and rest upon a flange formed integral with the panel and having a laterally open side by which the speaker may be subsequently slid laterally to disengage from the flange to permit removal of the speaker from the underside of the panel.

Another object, feature, and advantage of the invention resides in the provision of a vehicle package shelf panel having an aperture smaller than the speaker and a plurality of flanged tabs truck from the panel to surround only a portion of the aperture so that the speaker may be installed by raising the speaker into engagement with the underside of the panel and than sliding the speaker laterally of the panel to engage with the flanged tabs so that the speaker is supported between the flanged tabs and the underside of the panel.

A further feature, object, and advantage of the invention resides in the provision of a panel having an aperture smaller than the speaker and plurality of flanged tabs struck from the panel and surrounding only the portion of the aperture at generally diametrically opposed sides of the aperture so that the speaker may be installed by orienting the speaker axially with the aperture but in rotary disalignment with respect to the flanged tabs so that the speaker may be lifted against the underside of the panel and then rotated into engagement with the diametrically opposed flanged tabs so that the speaker is supported between the flanged tabs and the underside of the panel.

BRIEF DESCRIPTION ON THE DRAWINGS

These and other objects, features, and advantages of the invention will become apparent on consideration of the description of the preferred embodiment and the appended drawing in which;

FIG. 1 is a perspective view of a radio speaker poised the outerside of a vehicle package shelf panel in readiness for installation through an aperture to rest upon a mounting flange;

FIG. 2 is a plan view showing the package shelf panel and the flanged aperture of FIG. 1;

FIG. 3 is a sectional view taken in direction of arrows 3—3 of FIG. 2;

FIG. 4 is a sectional view taken in the direction of arrows 4—4 of FIG. 2;

DESCRIPTION OF THE PREFERRED EMBODIMENT

Figure 5:
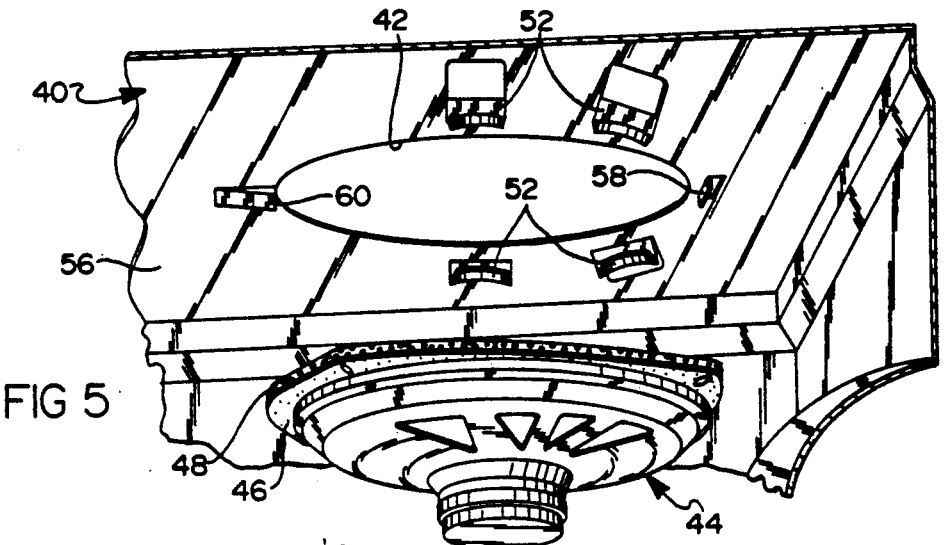
FIG. 5 shows the second embodiment of the invention in which speaker is installed against the underside of the panel and slid laterally into supporting engagement with the flanged tabs struck in the panel.

Referring to FIG. 1 it is seen that the package shelf panel 10 of the vehicle body is stamped from sheet metal and includes an aperture 12 for receiving a radio speaker 14. The speaker 14 is generally oval in shape, but may be round or rectangular as desired. The speaker 14 includes a stamped sheet metal housing including a flange 16 which carries a gasket 18 on the underside thereof.

Vehicle panel 10 includes an underside 20 and an outerside 22. The panel 10 also has a speaker mounting flange 26 which is stamped integrally with the panel 10 and surrounds about two-thirds of the periphery of the panel aperture 12 as best seen in FIGS. 1 and 2.

The speaker 14 is installed upon the panel 10 by dropping the speaker 14 from the outerside 22 of the panel 10 through the opening 12 to rest upon the flange 26. As best seen in FIG. 4 the flange 26 has a plurality of apertures 30 which register with mounting apertures 32 provided in the flange 16 of the speaker 14. A plurality of plastic fasteners, one of which is indicated at 34, are pressed through the apertures 30 of the speaker and into the aperture of the flange 26 to retain the speaker 14 and its gasket 18 in engagement with the flange 26.

After the speaker 14 and its fasteners 34 are installed, the speaker is concealed beneath a decorative trim panel 38 which is installed to overlie the outerside 22 of the panel 10 and has sound transmitting apertures which align with the speaker 14. The trim panel 38 may be constructed of cardboard covered with a vinyl or fabric trim material.

In the event it becomes necessary to remove the speaker 14 for service or replacement, the garage mechanic reaches into the passenger compartment and cuts or otherwise removes the fasteners 34. With the fasteners 34 removed, the speaker 14 may be slid laterally of the underside of the panel 10 away from the engagement with the flange 26. Accordingly it will be appreciated that the flange 26 is provided around the periphery of the aperture 12 to the largest degree possible in order to adequately support the speaker and Yet the one side of the aperture 12 must remain unobstructed by the flange 26 in order to permit the lateral sliding disengagement of the speaker 14 from the flange 26. Once the speaker 14 has been slid laterally to fully disengage from the flange 26, the speaker may be dropped away from the underside of the panel 20 for service or replacement.

Figure 6:
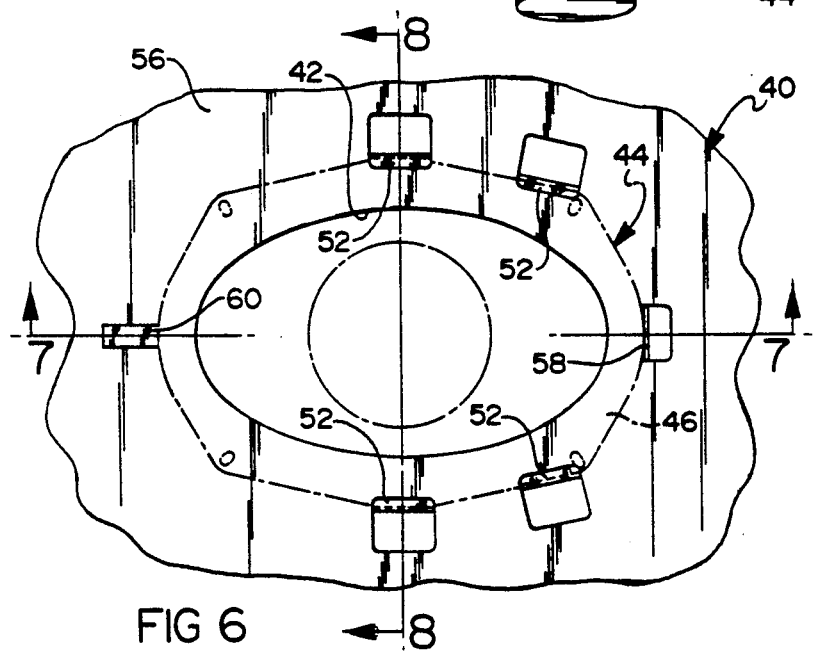
FIG. 6 is a plan view showing the embodiment of FIG. 5.
Figure 8:
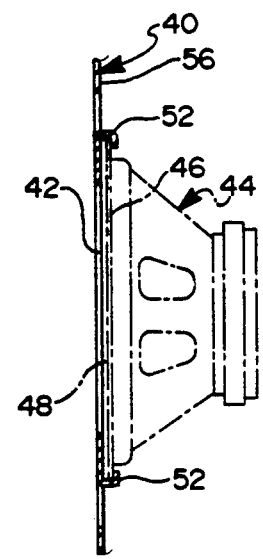
FIG. 8 is a sectional view taken in the direction of arrows 8—8 of FIG. 6.
Figure 7:
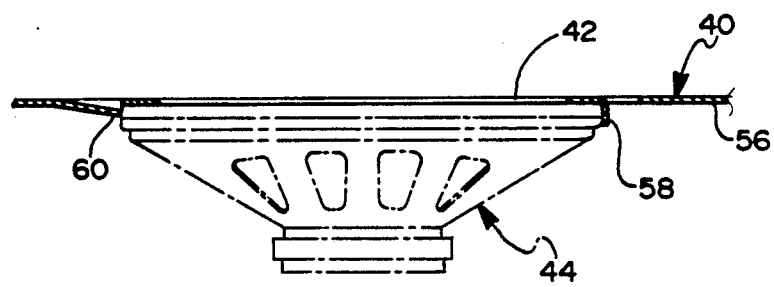
FIG. 7 is a sectional view taken in the direction of arrows 7—7 of FIG. 6.
Figure 9:
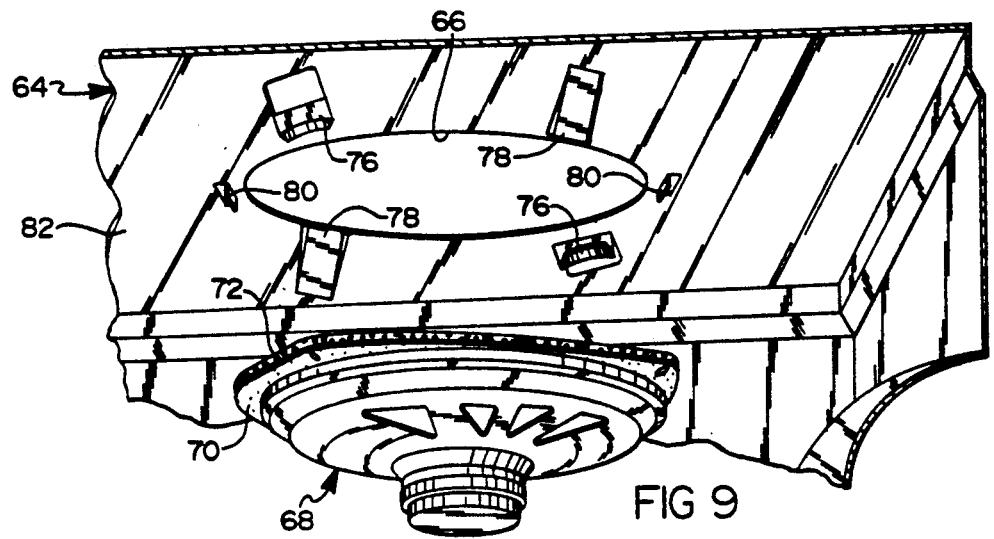
FIG. 9 is a perspective view of the third embodiment of the invention showing the speaker poised to be raised against the underside of a panel and rotated into supporting engagement with diametrically opposed flanged tabs struck from the package panel.

Referring to FIGS. 5 through 7, a second embodiment of the invention is shown. According to FIG. 5 the vehicle package shelf panel 40 has a speaker aperture 42 which is smaller than the speaker 44. The speaker 44 has a mounting flange 46 which carries a gasket 48 on the outerside thereof. A mounting flange for the speaker is provided by striking a plurality of flanged tabs 52 from the panel 40 to underlie the panel 40 and surround only the right hand side of the aperture 42 as shown in FIGS. 5 and 6. The speaker 44 is installed by sliding the speaker 44 laterally along the underside 56 of the panel 40 to engage the speaker flange 46 and gasket 48 in captured engagement between the underside 56 of the panel 10 and the flange tabs 52 as best seen in FIGS. 6 and 8.

As seen in FIGS. 5, 6 and 7 a stop tab 58 is also struck from the panel 40 and serves to stop the lateral sliding movement of the speaker 44 at its position of full engagement with the flange tabs 52. Furthermore, as seen in FIGS. 5, 6, and 7 a locking tab 60 is struck from the panel 40 and acts to lock the speaker 44 at its installed position of FIG. 6. The locking tab 60 flexes upwardly upon engagement by the speaker 44 to permit the speaker 44 to be slid laterally into its installed position of FIGS. 6 and 7. When the speaker 44 reaches its fully installed position the locking tab 60 springs from the panel 40 to engage the speaker 44 and retain the speaker in mounting engagement with the flange tabs 52 and the stop tab 58.

A third embodiment of the invention is shown in FIGS. 9–12. The package shelf panel 64 has a aperture 66 which is smaller than the speaker 68. The speaker 68 has a mounting flange 70 which carries a gasket 72 on the outerface thereof. The panel 64 has a pair of flange tabs 76 struck from the underside thereof at diametrically opposed relationship with one another with respect to the aperture 66. Furthermore a pair of locking tabs 78 are also struck from the panel 64 in diametrically opposed relation from each other and peripherally spaced from the flange tabs 76. In addition, a pair of locating tabs 80 are struck from the panel 64 in diametrically opposed relation from one another and spaced peripherally in between the flange tabs 76 and locking tabs 78.

Figure 10:
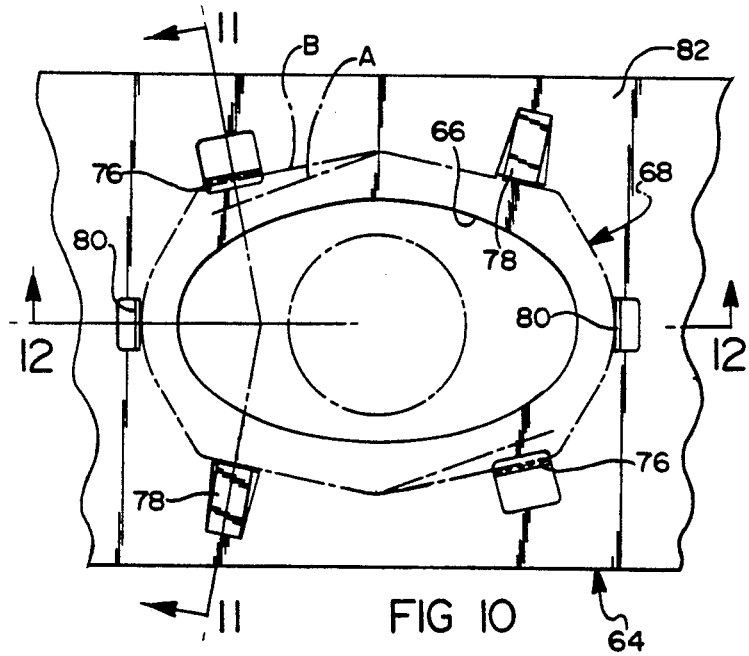
FIG. 10 is a plan view showing the speaker mounting apparatus of FIG. 9.
Figure 11:
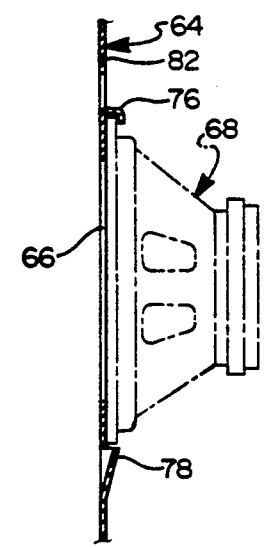
FIG. 11 is a sectional view taken in the direction of arrows 11—11 of FIG. 10.
Figure 12:
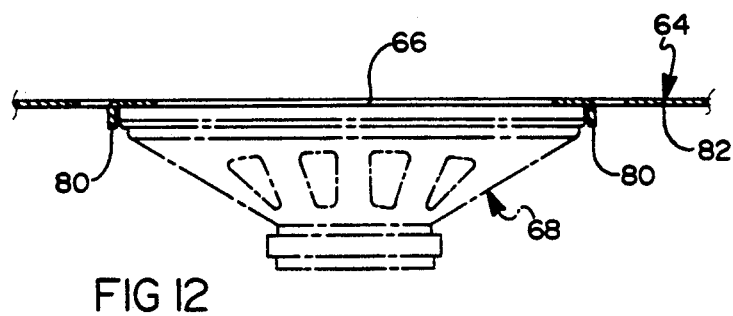
FIG. 12 is a sectional view taken in the direction of arrows 12—12 of FIG. 10.

As best seen in FIG. 10, the speaker 68 is installed against the underside 82 of the panel 64 by orienting the speaker 44 in a position of rotary disalignment indicated by the phantom line indicated position designated "A" in FIG. 10. At this rotary position "A" of the speaker, the speaker may be raised vertically into engagement with the underside 82 of the panel 64 without obstruction by the flange tabs 76 and as permitted by yielding of the locking tabs 78. The speaker 68 is then rotated in the clockwise direction as view in FIG. 10 to the rotary position of phantom line indicated rotary position designated "B" in FIG. 10 so that the speaker flange 70 become engaged with the flange tabs 76 and the locking tabs 78 are restored to their normal free state position of FIG. 11 in which the locking tabs 178 engage with the speaker 44 to prevent a subsequent counter clockwise rotation of the speaker. In addition, the locating tabs 80 effectively limit movement of the speaker laterally of the panel 64 to define the axis of speaker rotation. Accordingly, as best seen in FIG. 11 the speaker is effectively supported and retained against the underside 82 of the panel 64 by the cooperative effort of the flange tabs 76 and locking tabs 78 and the locating tabs 80.

The speaker 68 may be dismounted from the vehicle package shelf panel 64 by first pressing the locking tabs 78 upwardly to disengage from the speaker, and then rotating the speaker counter clockwise from the phantom line indicated mounted position "B" to the position of rotary disalignment "A".

Thus it is seen that the invention provides a new and improved speaker mounting apparatus and method which simplifies the removable mounting of radio speakers on the package shelf of a motor vehicle.

The embodiments of the invention in which an exclusive property or privilege is claimed are defined as follows:

1. Apparatus for mounting a radio speaker having a speaker flange in a vehicle body comprising:

a vehicle panel of the vehicle body having an outerside and an underside, an aperture through the vehicle panel, flange means of integral one piece construction with the vehicle panel on the underside thereof and underlying the aperture in spaced relation from the underside of the panel, said aperture being larger than the speaker flange and said flange means being smaller than the speaker flange so that the speaker rests with the speaker flange engaging upon the flange means so that the flange means supports the speaker in the aperture, and said flange means being stationary and immovable and surrounding only a portion of the aperture to define an opening laterally of the speaker through which the speaker may be removed from the underside of the panel only by movement laterally of the aperture.

2. Apparatus for mounting a radio speaker having a speaker flange in a vehicle body comprising:

a vehicle panel of the vehicle body having an outerside and an underside, an aperture through the vehicle panel, flange means of integral one piece construction with the vehicle panel on the underside thereof and underlying the aperture in spaced relation with the underside of the panel, said aperture being larger than the speaker flange so that the speaker rests with the speaker flange engaging upon the flange means so that the flange means supports the speaker in the aperture, said flange being stationary and immovable and surrounding only a portion of the aperture to define an opening laterally of the speaker through which the speaker may be removed from the underside of the panel only by movement laterally of the aperture, and fastener means installed from the outerside of the panel to retain the speaker on the panel and being removably from the underside of the panel to permit dismounting of the speaker from the panel.

* * * * *